(12) United States Patent
Svengalis

(10) Patent No.: US 11,845,406 B2
(45) Date of Patent: Dec. 19, 2023

(54) RETRACTABLE WINDSHIELD DEICER

(71) Applicant: SBCD Enterprises LLC, Los Angeles, CA (US)

(72) Inventor: David Svengalis, Los Angeles, CA (US)

(73) Assignee: SBCD Enterprises LLC, Los Angeles, CA (US)

( * ) Notice: Subject to any disclaimer, the term of this patent is extended or adjusted under 35 U.S.C. 154(b) by 55 days.

(21) Appl. No.: 16/393,813

(22) Filed: Apr. 24, 2019

(65) Prior Publication Data
US 2020/0339073 A1 Oct. 29, 2020

(51) Int. Cl.
*B60S 3/04* (2006.01)
*B26D 1/553* (2006.01)

(52) U.S. Cl.
CPC ............... *B60S 3/04* (2013.01); *B26D 1/553* (2013.01)

(58) Field of Classification Search
CPC ......... B60J 11/08; B60J 11/025; B60J 1/209; B60S 3/04; B26D 1/553
USPC ................... 296/95.1, 95.7, 97.8, 98, 136.01
See application file for complete search history.

(56) References Cited

U.S. PATENT DOCUMENTS

| | | | |
|---|---|---|---|
| 2,206,174 A * | 7/1940 | Falk | D06F 53/045 242/388.6 |
| 2,223,145 A * | 11/1940 | Wise | B60J 11/08 160/DIG. 3 |
| 2,646,118 A * | 7/1953 | Berty | B60J 11/08 160/369 |
| 2,823,746 A * | 2/1958 | Morgan | B60J 11/08 160/370.22 |
| 2,851,303 A * | 9/1958 | McQueen | B60J 11/025 160/370.22 |
| 2,865,514 A * | 12/1958 | Goodman | D06F 53/045 242/378 |
| 2,914,188 A * | 11/1959 | Hansen | D06F 53/045 242/378 |
| 2,989,267 A * | 6/1961 | Mehl | D06F 53/045 242/378 |
| 3,021,894 A * | 2/1962 | La Due | B60J 11/02 296/136.11 |
| 3,096,884 A * | 7/1963 | Leshner | D06F 53/045 242/395 |
| 3,454,300 A * | 7/1969 | Barhorst | B60J 11/025 160/370.22 |
| 3,477,660 A * | 11/1969 | Garnett | D06F 53/045 242/378 |
| 3,584,745 A * | 6/1971 | Wrightson | D06F 53/045 242/378 |
| 3,964,780 A * | 6/1976 | Naidu | B60J 11/08 150/168 |
| 4,399,347 A | 8/1983 | Schmitt | |
| 4,973,098 A | 11/1990 | McFall | |
| 5,035,460 A * | 7/1991 | Huang | B60J 11/08 160/370.21 |
| 5,564,770 A | 10/1996 | Smith et al. | |
| 5,615,923 A * | 4/1997 | Madison | B60J 11/08 160/370.21 |

(Continued)

*Primary Examiner* — Duy Vu N Deo
*Assistant Examiner* — Christopher Remavege
(74) *Attorney, Agent, or Firm* — Fulwider Patton LLP

(57) ABSTRACT

Rigid bars to be placed upstanding at the opposite sides of a windshield and a plurality of flexible strands connected between the bars in laterally spaced apart relationship.

3 Claims, 14 Drawing Sheets

(56) References Cited

U.S. PATENT DOCUMENTS

| | | | | |
|---|---|---|---|---|
| 5,615,924 | A  * | 4/1997 | Owen | B60J 11/025 |
| | | | | 160/370.22 |
| 6,938,666 | B1 * | 9/2005 | Ulriksen | E06B 9/08 |
| | | | | 160/31 |
| 7,931,325 | B2 | 4/2011 | Robbins | |
| 8,087,712 | B2 * | 1/2012 | Svengalis | B26D 1/553 |
| | | | | 160/370.21 |
| 11,358,459 | B1 * | 6/2022 | Miller | B60J 1/2047 |
| 2005/0236117 | A1 * | 10/2005 | Lin | B60J 7/0015 |
| | | | | 160/267.1 |
| 2009/0025890 | A1 * | 1/2009 | Chen | B60J 1/2088 |
| | | | | 160/370.21 |
| 2017/0021711 | A1 * | 1/2017 | Mansueto | B60J 11/08 |

* cited by examiner

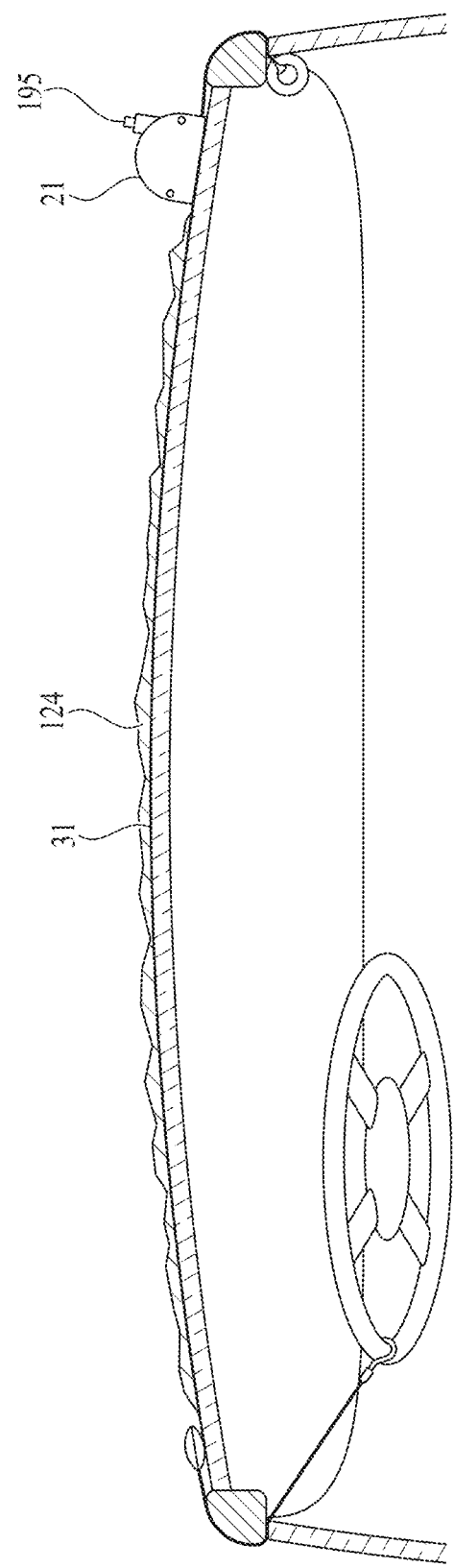

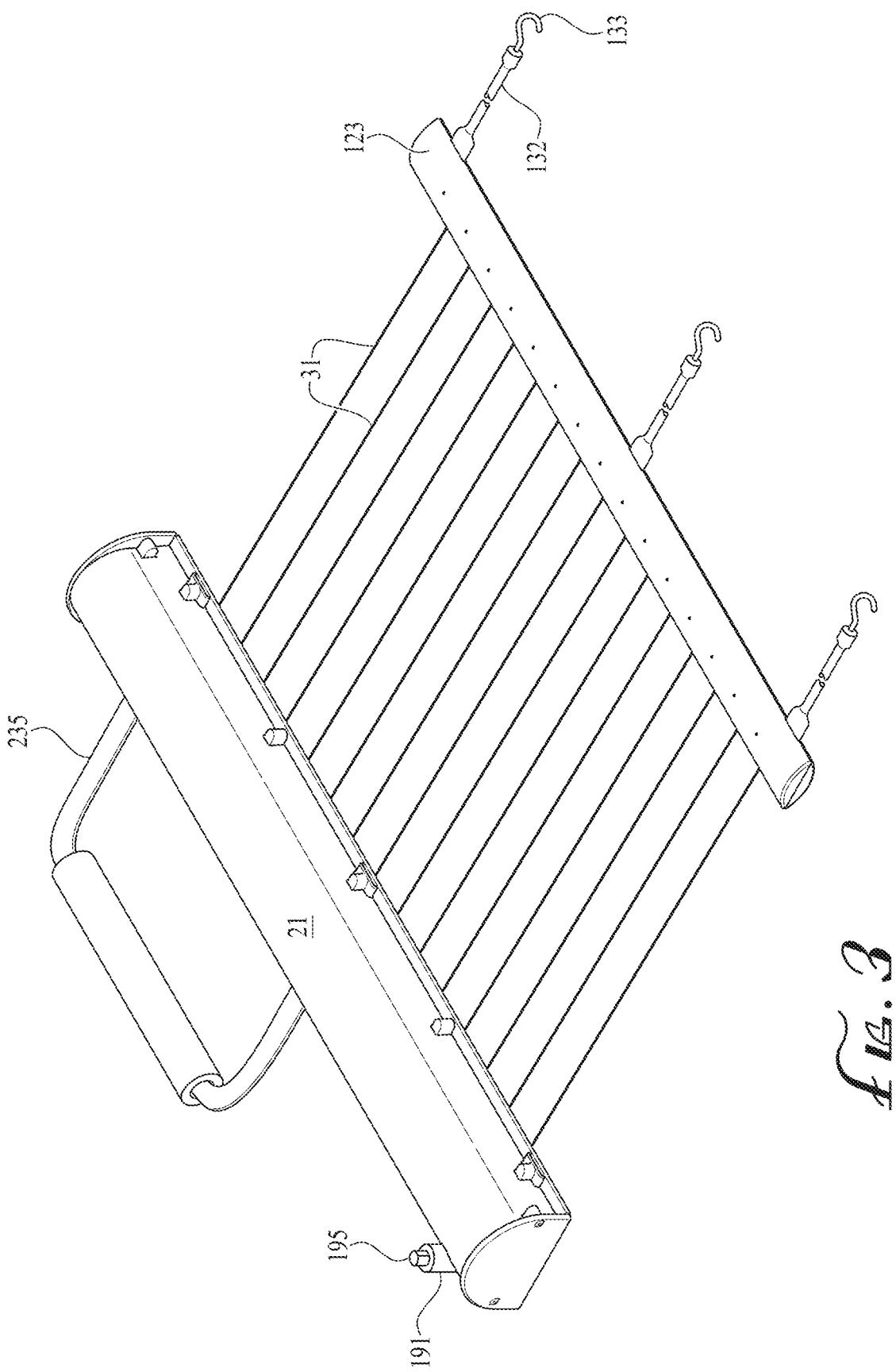

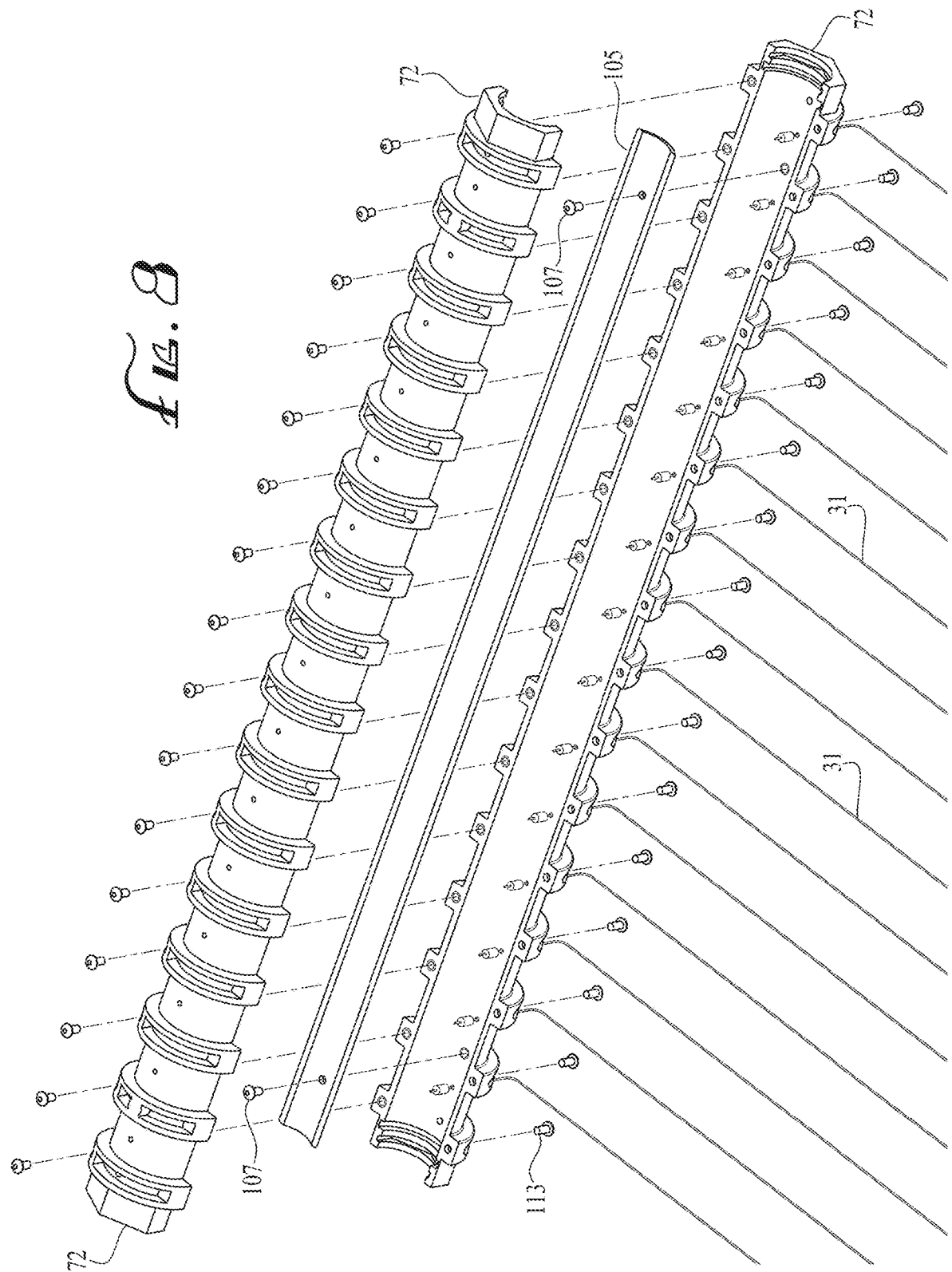

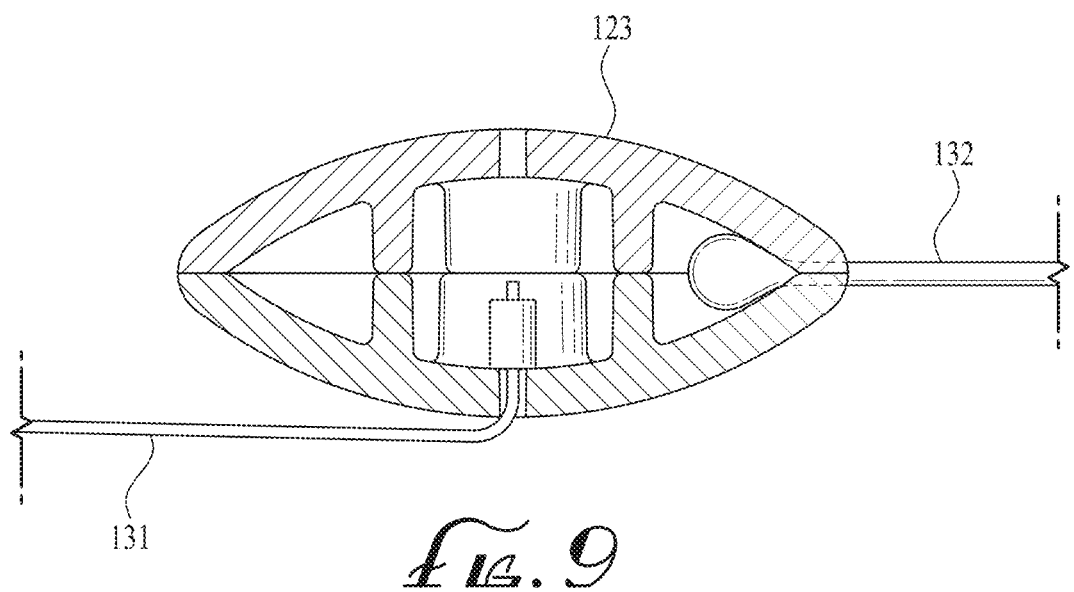

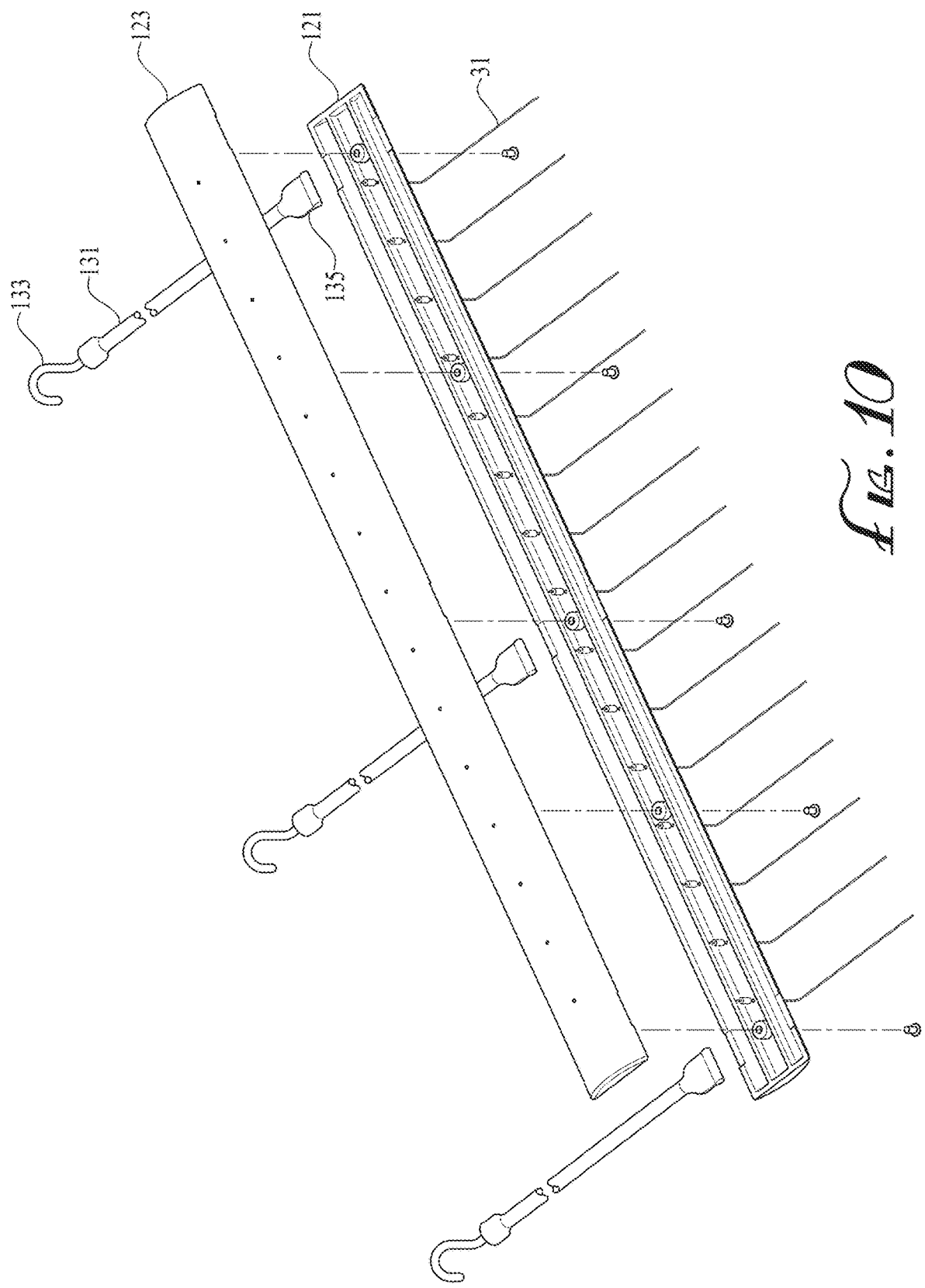

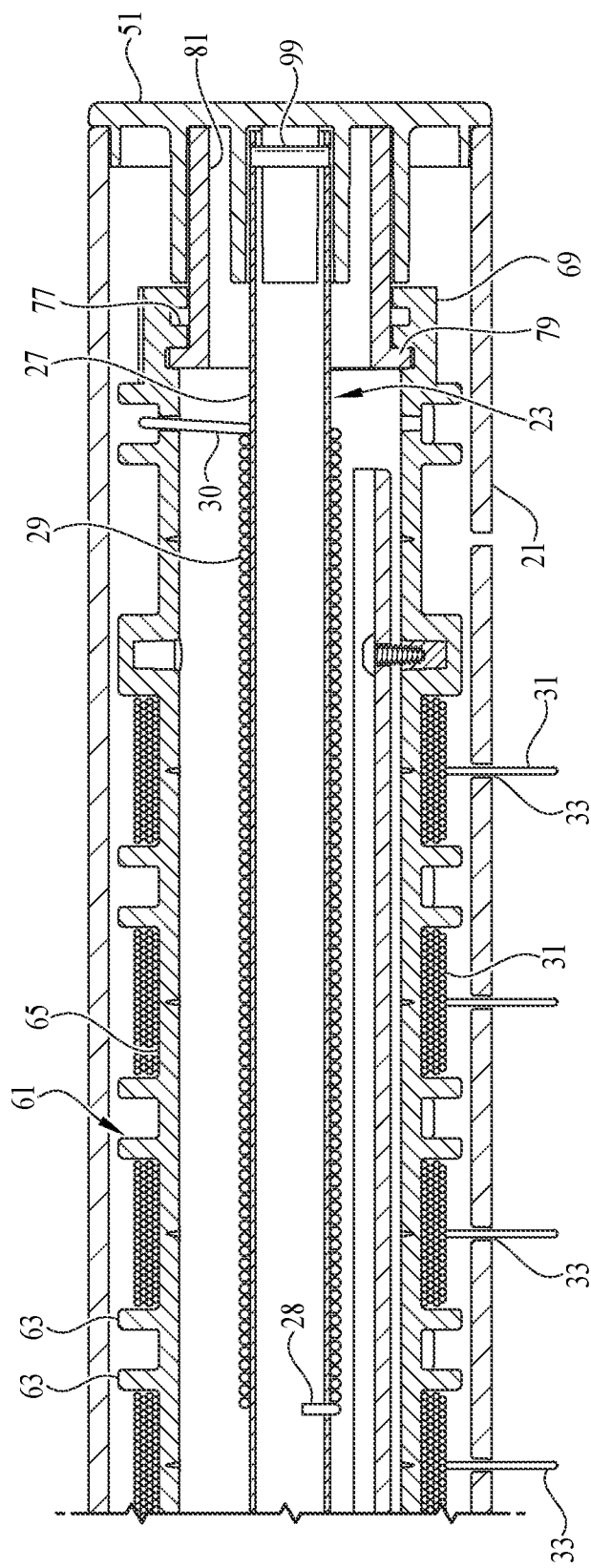

RETRACTABLE WINDSHIELD DEICER

BACKGROUND

Field of the Invention

The present invention relates to vehicle windshield covering devices.

Description of the Prior Art

The need for an effective windshield covering device for protection against and removal of ice has long existed. As recognized in my U.S. Pat. No. 8,087,712, there has been a long standing need for a convenient and effective device for removing ice from the windshield of an automobile.

Safety is of the utmost importance when driving in the largest cities. In all cases visibility through the windshield is paramount. In the winter visibility can be obscured by patches or even full sheets of ice on covering portions or all of the windshield. As drivers in winter climates will attest, at just above or below freezing temperatures precipitation settling on the windshield can cause serious and dangerous problems blocking or obscuring vision though the front windshield. This problem is exacerbated by precipitation which can freeze in sheets on a windshield, adhering to the windshield surface and resisting removal efforts to clear the field of vision for the driver. Many efforts have been made to provide protection of the windshield from coating over with ice and for removing a coat of ice which may have formed thereon. The familiar hand-held ice scraper is often employed to attack the frozen sheet which can be very hard. Hardness is a measure of stress required for plasticity of the ice so as to produce permanent deformation, i.e. breaking up of the ice. The yield stress of ice increases with decreasing temperature which can present particular problems for a driver of a vehicle in extremely cold weather seeking to remove windshield ice so as to get under way. The ice scraping process can be time consuming and all too frequently results in the hardness of the ice winning out over the strength of a plastic ice scraper, leaving the would-be driver in a dilemma; wait for the windshield defroster to melt the ice away or get underway with obscured vision thus endangering himself or herself, as well as oncoming traffic.

Examples of prior efforts to solve the problem include the snow screen proposed in U.S. Pat. No. 5,564,770 to Smith to cover the windshield when the car is to be parked in inclement weather so that ice will form on the sheet rather than directly on the windshield. Such devices, while helpful to cover the windshield, suffer the shortcoming that a sheet of the type proposed can often itself become frozen to the windshield or becomes ladened with snow, ice and slush causing it to freeze in place or to so load the sheet with weight as to present a considerable challenge in seeking to remove it from the windshield for discharge of the snow and collapse and storage. Furthermore, covering sheets having sufficient area to cover the windshield are large and can be unwieldy rendering them difficult to handle and can occupy significant storage space when not in use.

In recognition of this problem it has been proposed to provide a windshield protector in the form of an impervious sheet which can be scrolled into a scroll within a housing. A device of this type is shown in U.S. Pat. No. 2,851,303 to McQueen. Such devices again, have not generally gained in popularity because the sheet tends to freeze to the windshield and, furthermore, can become ladened with ice and snow rendering its removal quite challenging, sometimes resulting in tearing of the sheet itself.

Other efforts to solve the problem have led to a proposal that an electrical heating sheet be spread over the windshield and connected with an electrical source. A device of this type is shown in U.S. Pat. No. 4,399,347 to Schmidt. Such devices have met resistance in the marketplace as they require considerable time to deploy and require access to an electrical source.

Other sheet devices have been proposed as described in U.S. Pat. No. 4,973,098 to McFall and U.S. Pat. No. 7,931,325 to Robbins. There remains a need for a windshield deicer which is effective to protect the windshield and can easily be removed irrespective of an accumulation of ice and snow.

Ice adhesion is based on physical and chemical processes that exist between the ice-solid surface. Generally, the adhesion forces can be categorized into different types: chemical adhesion that includes covalent and electrostatic forces; thermodynamic adhesion involving Van der Waals forces and hydrogen bonding; mechanical adhesion due to sold surface roughness.

The attraction between the two substrates is caused by transfer of electrons, which is based on Coulomb's Law, and the exceptor-donor in a reaction. Hydrogen bonding is caused by the distribution of proton (hydrogen atom) between two electromagnetic atoms such as oxygen, nitrogen or fluorine. These forces are responsible for the cohesion of solid ice from liquid water.

The asperities or pores present on the surface of glass result in the liquid water penetrating often resulting in mechanical locking or friction upon solidification. The mechanical bonds occur in micrometer range compared to much smaller forces discussed above. The effect of mechanical bonding can be observed by surface roughness parameter measured by devices such as optical microscopes. Irrespective of the manner in which the ice bonds to the windshield, it is recognized that the ice removal can be a challenging, time-consuming and often an unproductive enterprise.

SUMMARY OF THE INVENTION

The present invention includes, generally, elongated bars to be spaced upright on opposite sides of a windshield to position a plurality of laterally spaced strands extending there between resting on the windshield. In my preferred embodiment one of the bars is in the form of an elongated casing housing an elongated rotary spool for rotation to unreel strands of wire, composite or the like, having free ends to be dispensed through a side opening to be spread in spaced relationship extending from one side of the windshield across the surface of the windshield to the other side.

BRIEF DESCRIPTION OF THE DRAWINGS

FIG. 2A is a transverse sectional view, in enlarged scale, of the windshield area of the vehicle shown in FIG. 1;

FIG. 3 is a perspective view, in enlarged scale, of the deicer device shown in FIG. 1;

FIG. 8 is a partial perspective view of the device shown in FIG. 7 but in enlarged scale;

FIG. 9 is a transverse sectional view, in enlarged scale, of a draw bar included in the deicer device shown in FIG. 1;

FIG. 10 is a partial exploded perspective view, in enlarged scale, of the device shown in FIG. 1;

FIG. 11 is a longitudinal sectional view of the housing of the device shown in FIG. 1;

DETAILED DESCRIPTION OF THE PREFERRED EMBODIMENTS

Figure 1:
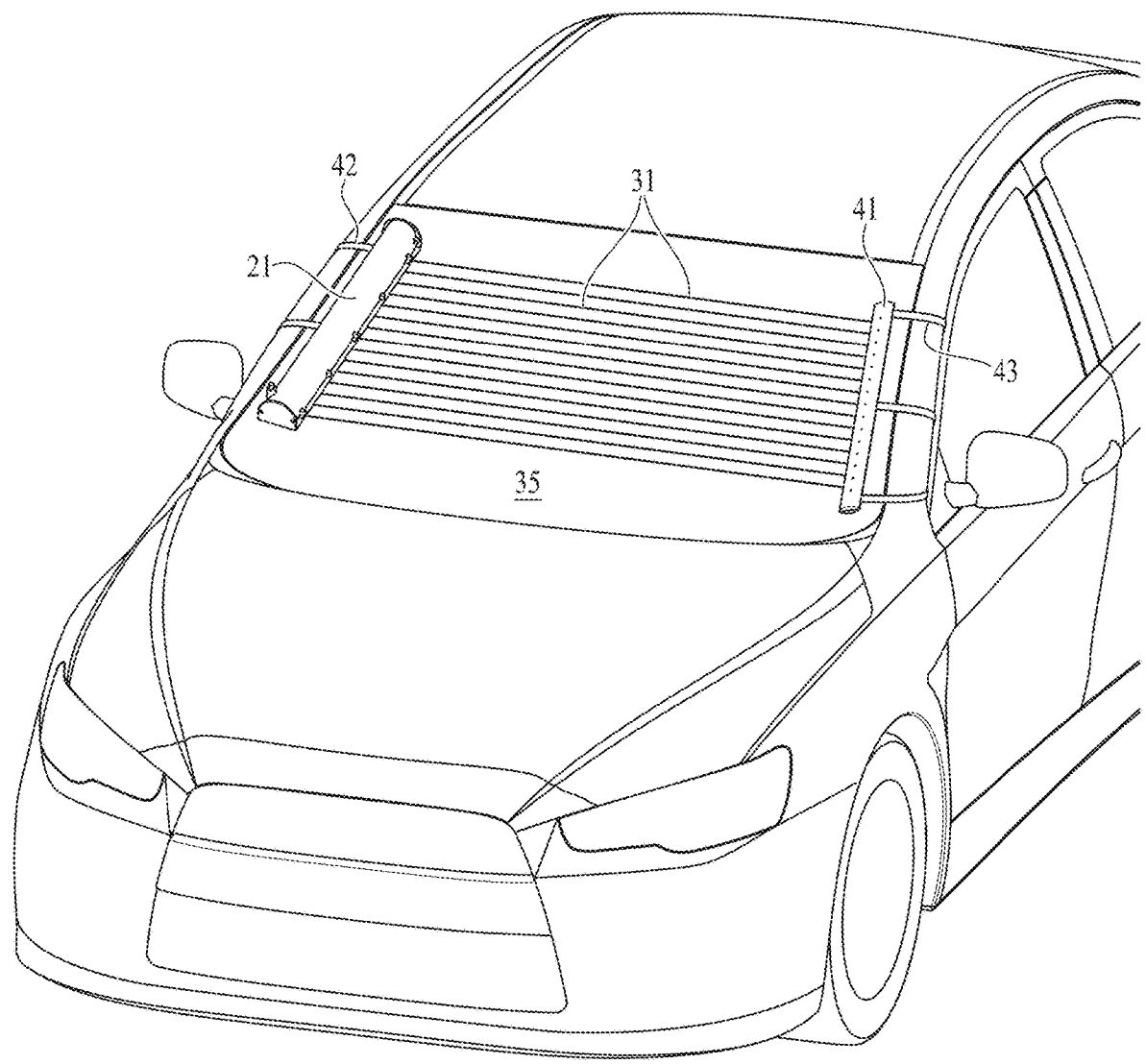
FIG. 1 is a perspective view of an automobile with a deicer device of the present invention deployed on the surface of the windshield.
Figure 7:
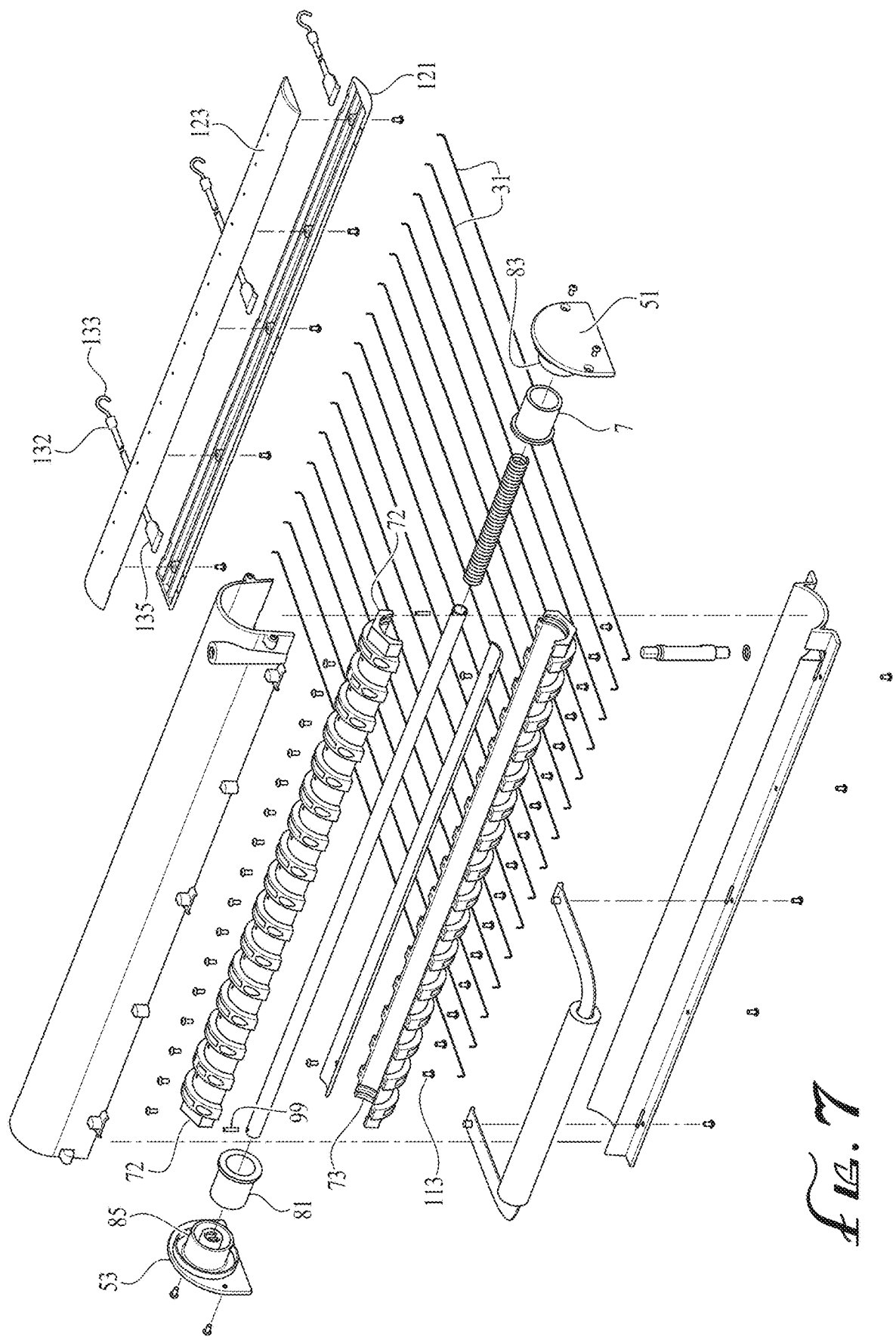
FIG. 7 is an exploded perspective view, in reduced scale, of the deicer device shown in FIG. 1.

Referring to FIGS. 7, 8 and 11, the deicer device of the present invention includes, generally, an elongated housing 21 mounting a spool 23 on the interior thereof. The spool includes a series of concentric tubular members, including elongated tube 27 having a coil spring 29 telescoped there over and connected to the housing 21 on one end and connected to the spool on the opposite end to cooperate in applying a torque. The spool is configured to wrap strands 31 threaded through openings 33 in the housing 21 such that the strands may be played out through such openings to cover the automobile windshield 35 (FIG. 1). The free ends of such strands 31 are connected to an a draw bar 41 which may include tethers 43 to be trapped at their free extremities between the door and door frame on one side of a vehicle. The housing 21 may also include tethers 42 to be trapped between the car door and frame to anchor the housing in position on the opposite side of the vehicle.

Thus, the strands 31 may be placed across the surface of the windshield and, upon the windshield being covered with a layer of snow, ice, slush or a combinations thereof, the tethers of the draw bar 41 may be released from the car door and the bar lifted to raise the proximate lengths of the strands 31 upwardly away from the windshield to cut progressively through the ice and slush and break away the overlying sheets of ice or the like along strips defined between the strands. This progressive lifting of the strands will cut defined lines in the ice and apply bending torque to the adjacent segments of ice tending to progressively break attachment from the windshield and lift the near sides of those segments away from the windshield. The resultant broken segments, already separated from adherence to the windshield, can thus be easily removed by swiping with a gloved hand or application of an ice scraper.

In many areas of the hemispheres away from the equator, winter weather brings on freezing temperatures which result in moisture or the like collected on a windshield freezing against the windshield and presenting the driver with a challenge of removing the ice to clear his or her vision for driving the vehicle. It has been common practice for the drivers in wintertime to carry a hand held ice scraper or the like in the vehicle and before driving, attacking the coated windshield with that tool. This generates a serious challenge in that at colder temperatures the ice is frozen solid and resists removal, often resulting in a plastic ice scraper being broken. Flexible cloth or plastic sheets have been proposed to cover the windshield or even a conventional everyday blanket placed across the windshield when the car is parked in the evening in hopes that any ice or snow collecting on the windshield overnight can be more easily removed by lifting the blanket away from the windshield.

This approach has not gained popularity because the sheets are often cumbersome to handle and they themselves become covered with ice and snow such that removal is difficult, often leading to the material of the sheet itself being torn during the removal process. Drivers attempting to use an ice scraper or other implements in an effort to assist in removal of the sheet covering the windshield sometimes results in scraping against the surface of the windshield, scarring and marring the vision of the driver through the windshield. By experimenting, I have discovered that it is better to be proactive in cold weather when it is expected that ice may be formed on the windshield.

I have worked with different materials, diameters and lengths of strands in effort to come up with and optimal construction. My experimentation with the removal of physical ice sheets has proven that flexible metal wires of the type typically used in fishing tackle as leaders perform well, typically in diameters of about 0.024 inches and about 25-30 inches long depending on the application.

In my exemplary embodiment, I construct my housing of formed metal, plastic or other convenient material. For the exemplary embodiment, I configure it in the form of elongated top and bottom half tubes 50 and 52 (FIG. 6A) clamped together to cooperate in forming a cylinder with open, opposite ends to be closed by respective end caps 51 and 53. In this embodiment, I form the bottom half tube 52 with individual, longitudinally spaced apart drilled bores defining the openings 33 (FIG. 11) for threading of each of the individual strands 31. As will be apparent to those of skill in the art, the openings may take many different forms, such as individual elongated slots, one long slot accommodating all strands or possibly a flexible wiper along one side of the slot to apply resistance forces to the strands.

Figure 6A:
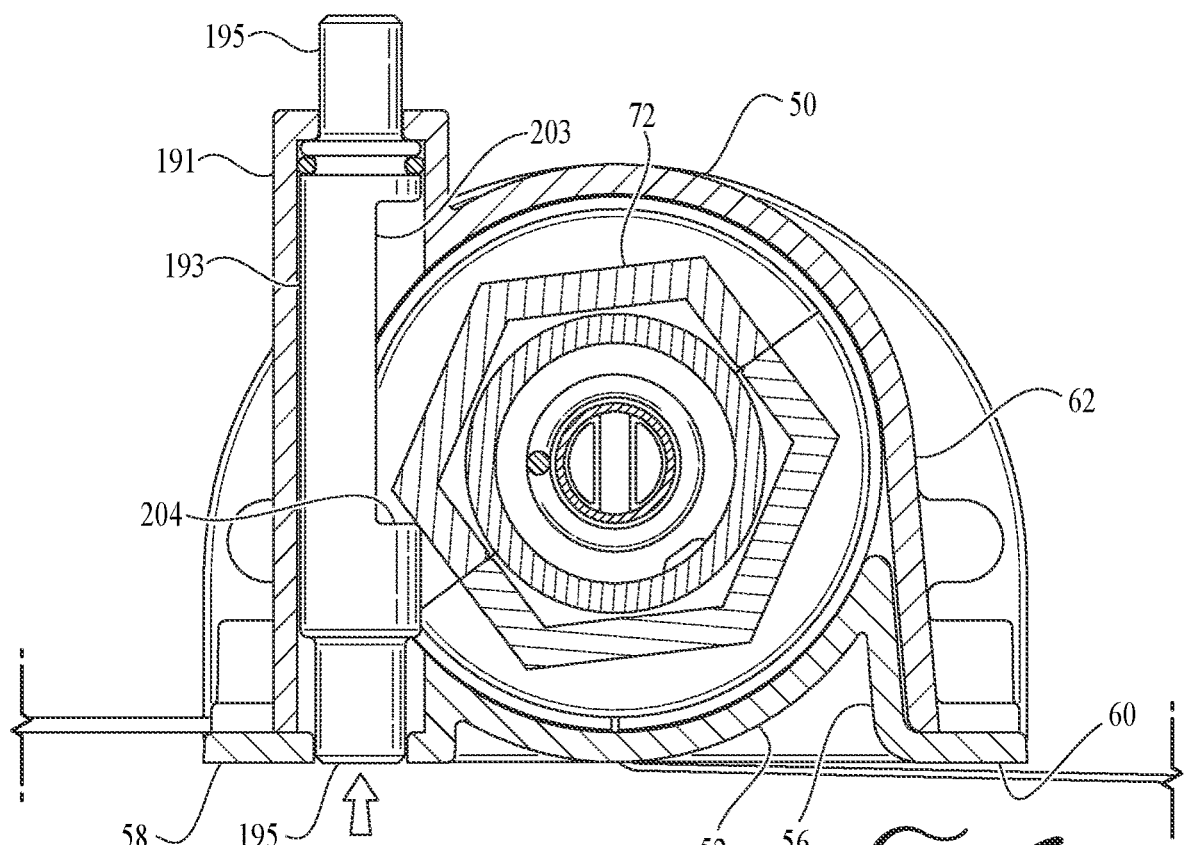
FIGS. 6A and 6B are transverse sectional views, in enlarged scale, depicting a plunger brake device for locking the dispensing spool of the device against deployment.
Figure 6B:
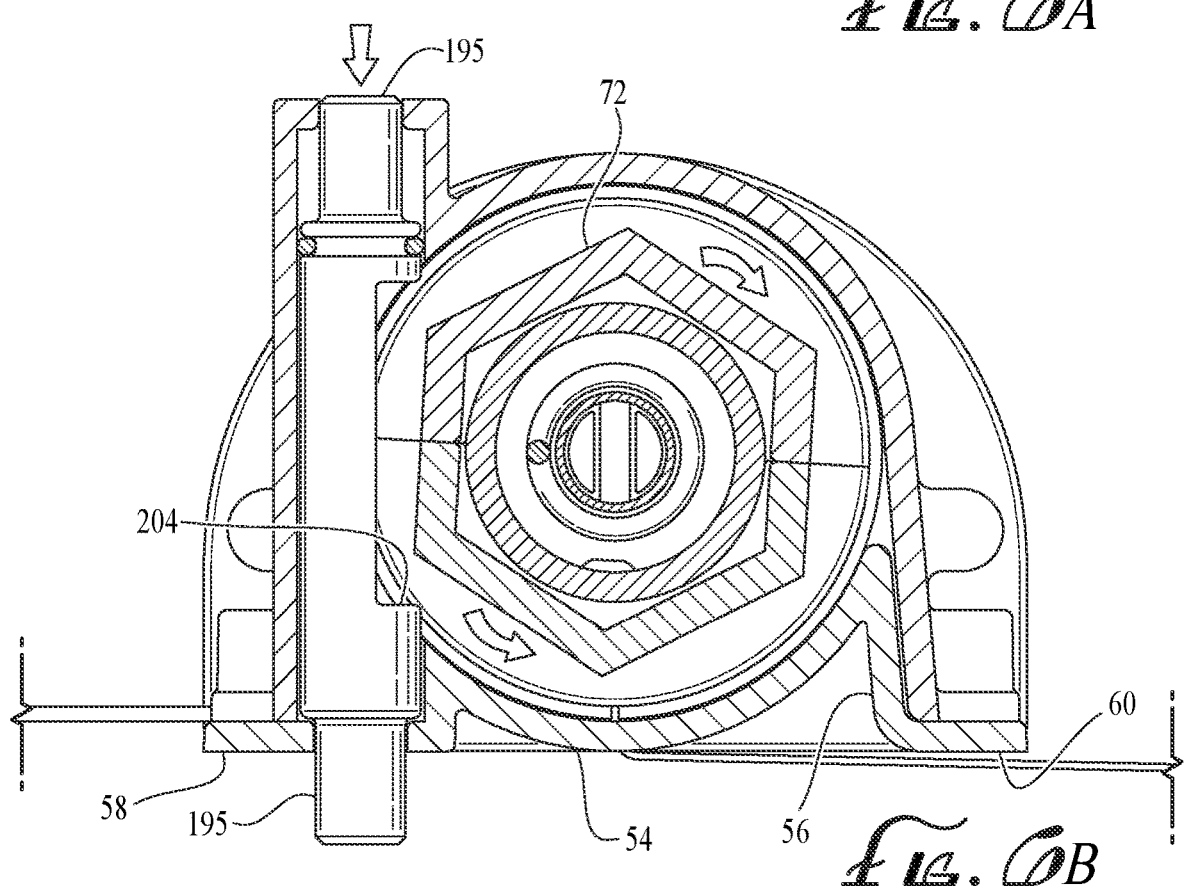

I form my bottom half housing 52 with an arcuate medial tubular portion 54 to open upwardly and formed on its diametrical opposite sides curved upwardly and then turned down to form upstanding legs 56 turned outwardly at the bottom extremities to form respective out turned flanges 58 and 60. The top half of the housing is cylindrically shaped and formed on its opposite sides with downwardly projecting flanges 62 juxtaposed thin legs 56 and terminating in bottom edges abutting the respected horizontal flanges 60. Referring to FIGS. 6A and 6B, it will be noted that the strand openings are formed on the bottom side of the housing to dispense the strands 31 down into juxtaposition against the surface of the windshield and to be pressed under the flanges 60 against such windshield to cooperate on mounting positioning of the strands.

I configure my spool device with a segmented tube, generally designated 61 (FIG. 11), formed in equidistance spaced relationship there along the length thereof with annular flanges 63 to form individual spools or barrels 65 for controlled reeling thereon of the respective strands 31. In the exemplary embodiment I form my tube 61 of clamshell half tubes 72 and 73 (FIG. 7) for convenient closure concentrically about central tube 27 and coil spring 29 and formed at the opposite ends with respective hex bosses 69 having radially inwardly projecting annular flanges 77 (FIG. 11) which clasp over respective flanges 79 of tubular end fittings 81.

Referring to FIGS. 7 and 8, opposite ends of the tube 27 are received in respective concentric stub tube 80 of end fittings 79 and 81 which are, in turn, received in the cylindrical receivers 83 and 85 formed on the confronting sides of the respective end caps 51 and 53.

Figure 12A:
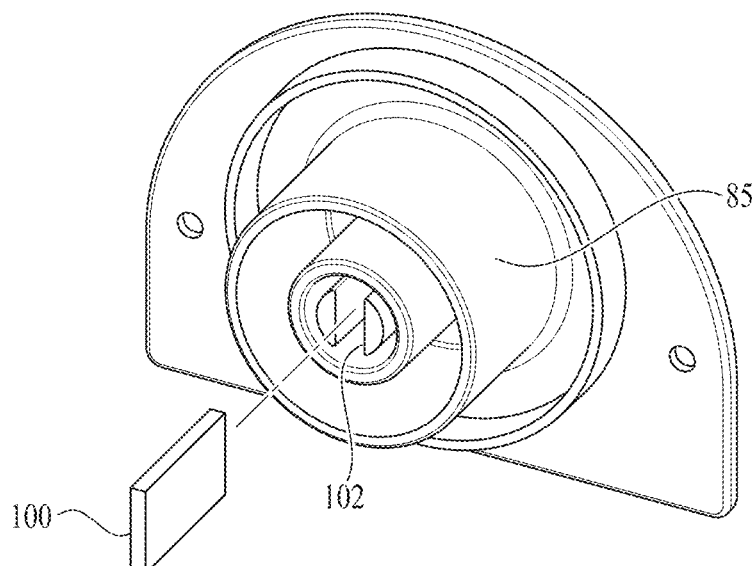
FIGS. 12A and 12B are perspective views, in enlarged scale, of a hub at one end of the housing shown in FIG. 11.
Figure 12B:
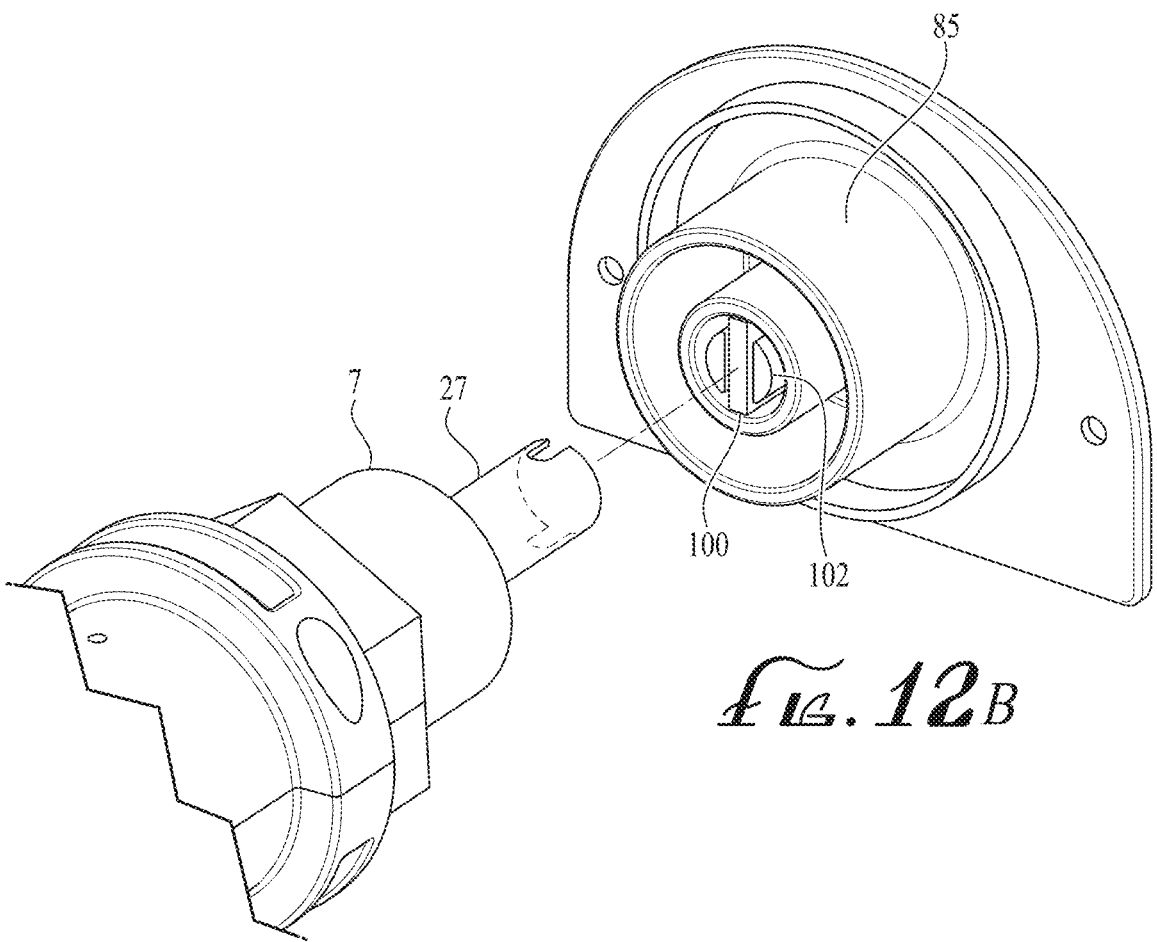
Figure 13:
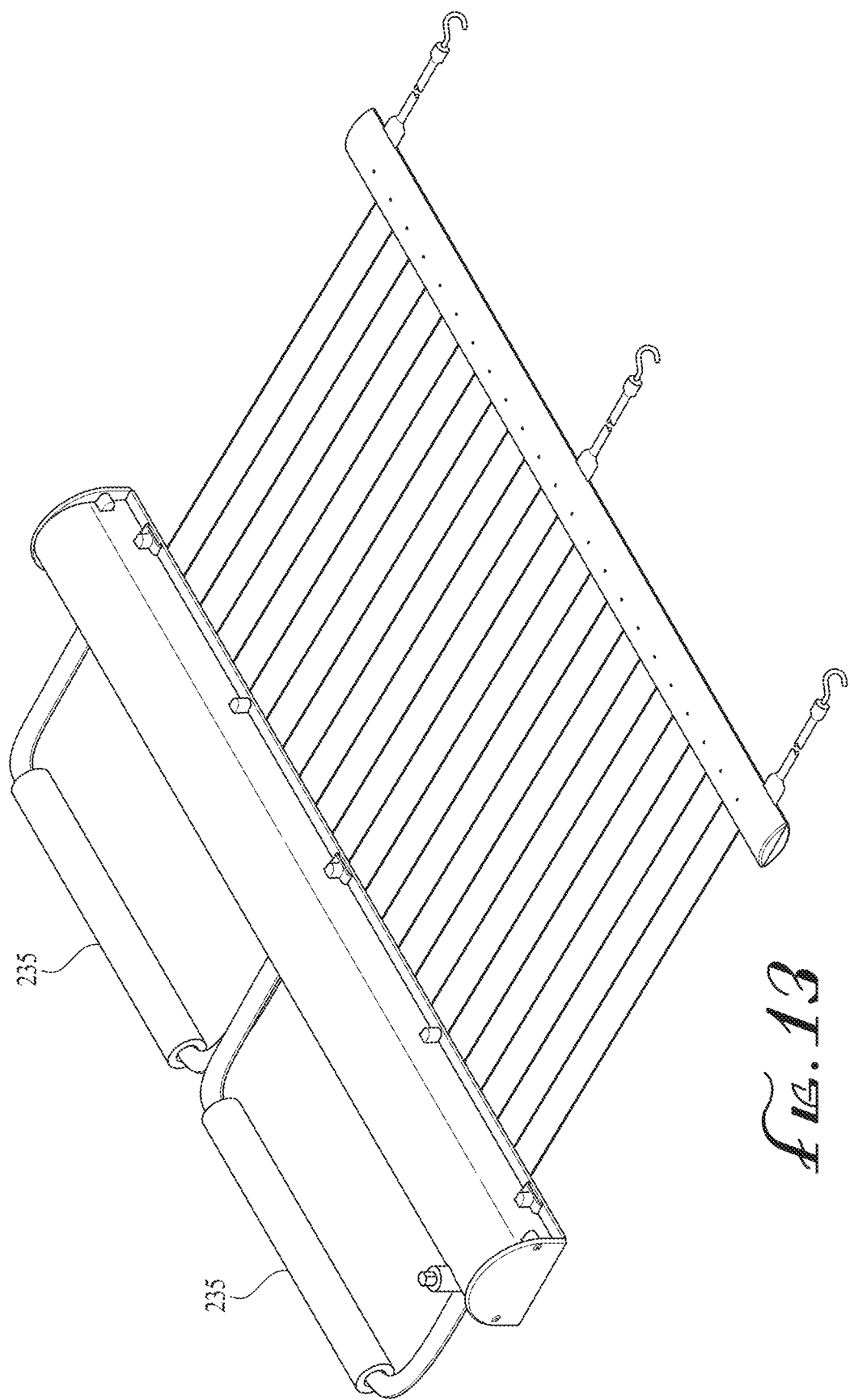
FIG. 13 is a perspective view, in enlarged scale, of the deicer device shown in FIG. 1.

One end of the tube 27 is keyed to the end fitting 51 by means of a roll pin 99 (FIG. 11) and the opposite end is keyed to the fitting 85 by means of a rectangular key 100 received on one end in slot 102 with the opposite end received in open ended slot 98 in the end of tube 97 (FIGS. 12A and 12B).

With continued reference to FIG. 8, the interior of the half tube 73 is lined by a semi-circular strip 105 screwed in place by means of screws 107. The interior ends of the respective strands 31 are threaded through peripheral boss 90 in flanges formed in the bottom half tube and the ends thereof anchored in place by crimps 92 (FIG. 8).

The extending extremities of the strands 31 are clamped between elongated clamshell halves 121 and 123 making up the draw bar. Also trapped between such halves 121 and 123 are the respective tethers 132 formed on their free extremities with hooks 133. The proximal ends of the respective tethers 132 are formed with anchor tabs 135 trapped between the half tubes 121 and 123.

Referring to FIGS. 6A and 6B, the housing is formed on one side near one end with a diametrically projecting, tangential barrel 191 for telescopically receipt of a cylindrical pin defining a pusher 193 having reduced in diameter push buttons 195 projecting from the opposite ends thereof. The upper button 195 serves as a manual push button and the lower button 195 is aligned with a bore in the flange 58 for clearance when the pusher 193 is depressed to the position shown in FIG. 6B. The pusher 193 is formed medially on one side confronting the hex boss 72 with a longitudinally projecting clearance notch 203 which is constructed to, when in the position shown in FIG. 6B, provide clearance of the corners of the hex boss 72 to free the scroll for unwinding. Then when pressed to its up, stop position shown in FIG. 6A the cylinder 193 is disposed with the lower end 204 of the notch 203 positioned in the rotary path of the corners of the hex boss 72 to engage the corner of the hex boss to block rotation thereof to lock the scroll in its selected position.

As shown in FIG. 3, connected with the housing 21 is a tether handle 235 which may be selectively trapped between the door and door frame of the vehicle to anchor the housing 21 in place.

From the above description it will be apparent to those of skill that the relatively small diameter of the strands 31 is beneficial in that for the majority of applications, when a sheet of ice is formed over the windshield and over the strands, the sheet will be thicker than the diameter of the strands. With this configuration when the draw bar 41 is lifted at one end lifting the proximate ends of the strands will tend to cut progressively through the weakened or thin layer of the ice bridging there over to thus essentially cut channels in the ice between strips of such ice and tend to lift the proximate sides of the strips of the sections off the windshield for removal. Such strips may be readily removed manually or in some situations by minimal application of an ice scraper which will engage only minimal resistance from adherence of such strips to the windshield thereby providing for convenient and efficient removal.

Figure 14:
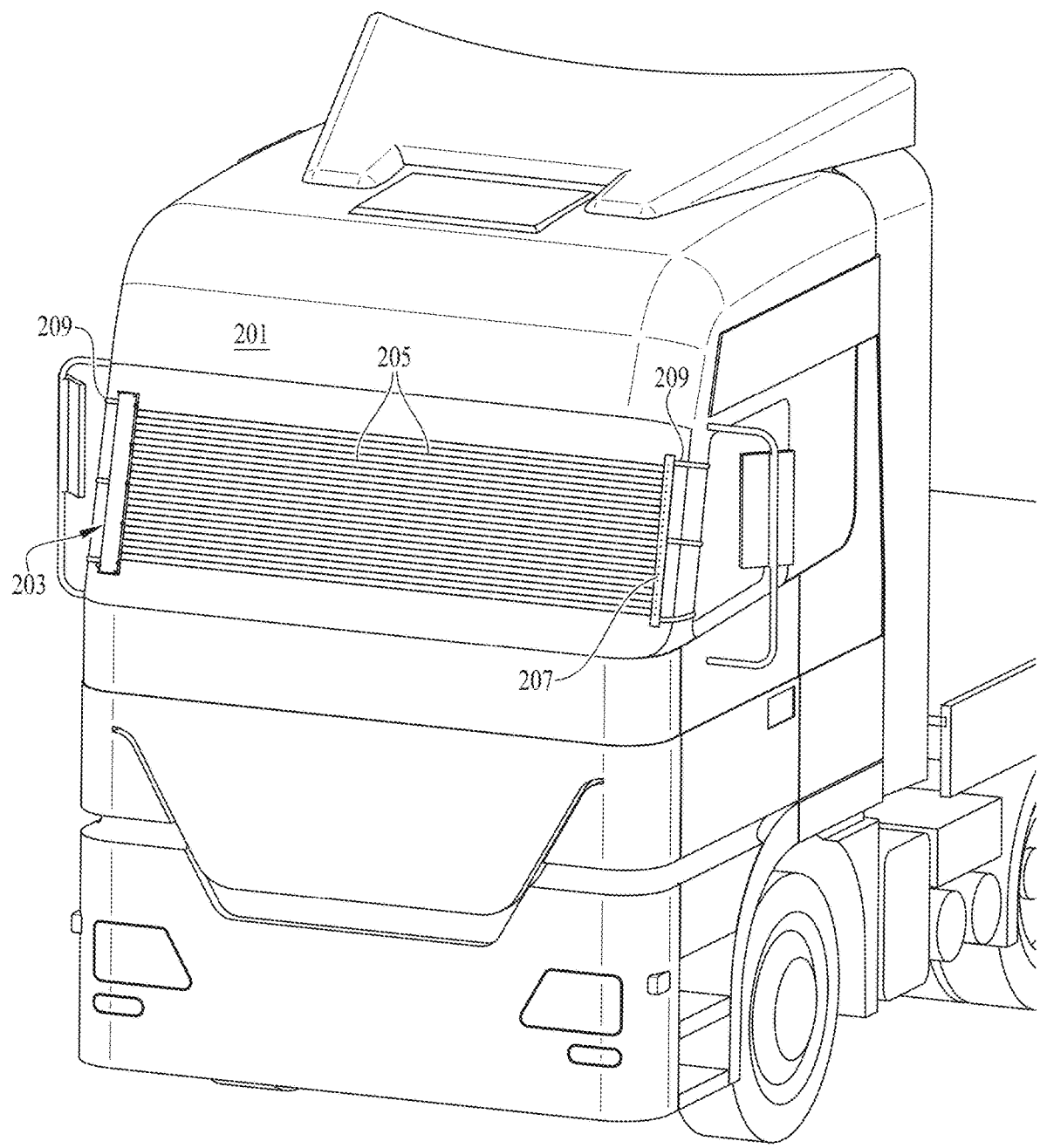
FIG. 14 is a perspective view of an over-sized deicer device of the present invention applied to the front windshield of a truck tractor cab.

Referring to FIG. 14, I show therein a further embodiment of my deicer of the present invention for application to the front windshield of a truck cab 201. The deicer device here includes a tubular housing 203 for dispensing the wire strands 205 which are anchored at their opposite ends to a draw bar 207 by respective tethers 209 and 211 are extending from the housing 203 and draw bar 207, respectively, for anchoring between the truck passenger and driver doors and the respective frames.

In operation, it will be appreciated that the device of the present invention may be easily assembled and the spool wound within the coil spring 29 to tension the coil spring through several turns between its anchor position on the tube 27 and the housing 21 to establish a loaded position with the tethers fully retracted. The device will thus normally be stored with the tethers retracted fully to the compact position locating the draw bar 41 juxtaposed the housing 21.

When a car is then to be parked in inclement weather, the device may be withdrawn from the trunk area or rear seat and the housing 21 positioned in a vertical upstanding, orientation on one side of the windshield, as for instance, adjacent the passenger's side, and the tether 43 trapped between the door and door frame. The draw bar 41 may then be drawn across the windshield to the driver's side to apply slight tension to the strands while the tethers 41 anchored to the driver's side by either the hooks or merely trapping the tethers between the door and frame. The strands will be drawn out of the housing to extend under the flange 60 (FIGS. 6A and 6B) to be pressed against the windshield by such flange. The strands 31 will thus be disposed in spaced apart relationship, as for instance one and a half inches apart across the surface of the windshield and held in place by the flange 60 pressing them against the windshield (FIGS. 6A and 6B) and tensioning the strands 31 to cooperate in maintaining the spaced relationship.

Figure 2B:
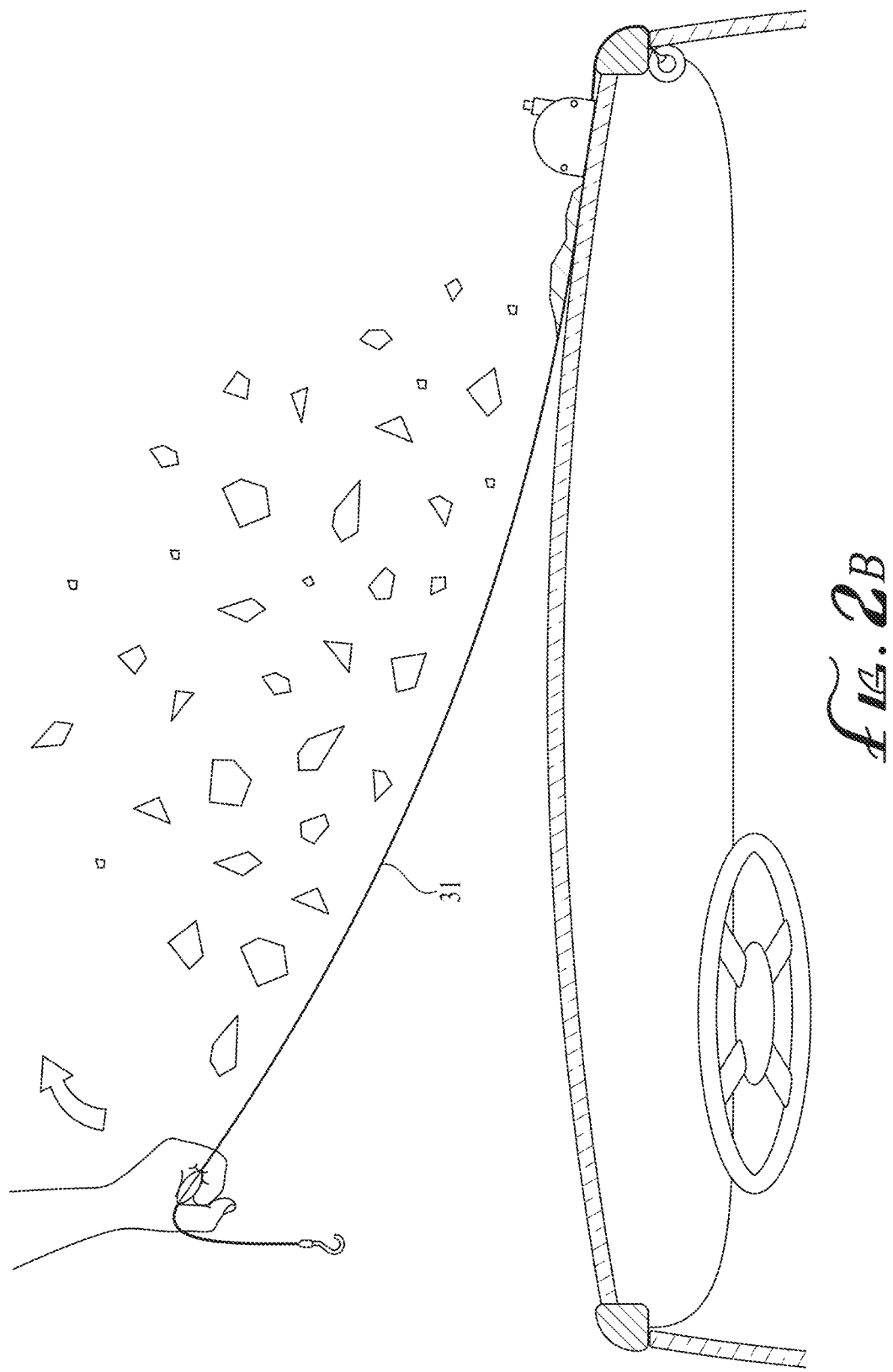
FIG. 2B is a transverse sectional view similar to FIG. 2A but depicting the deicer device of the present invention as it is being removed from the windshield.
Figure 4:
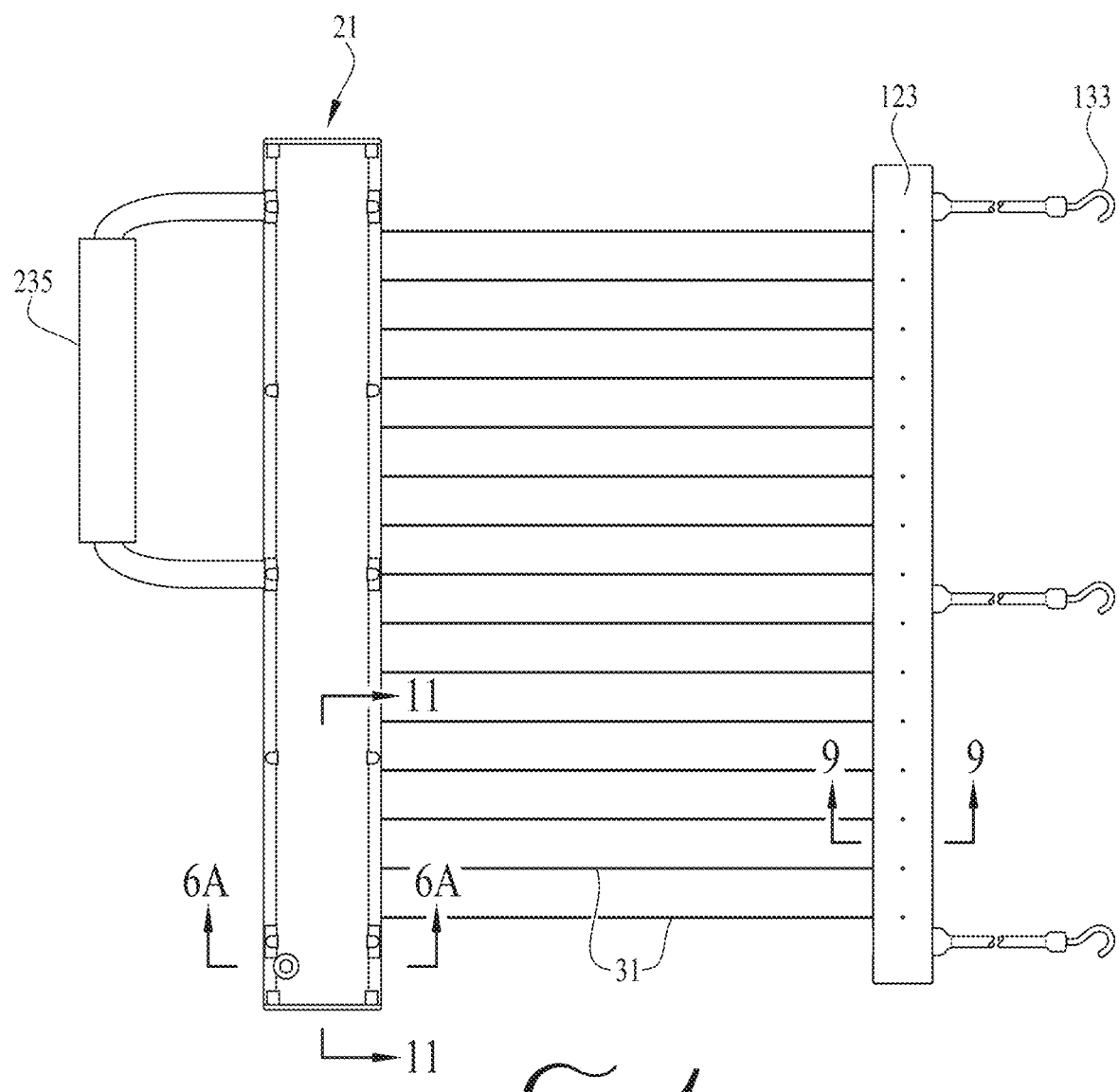
FIG. 4 is a top view of the deicer device shown in FIG. 3.
Figure 5:
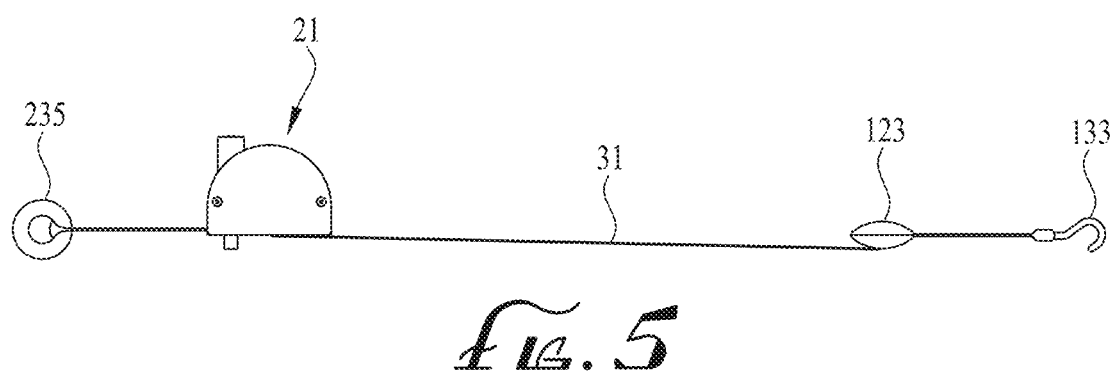
FIG. 5 is a side view of the deicer device shown in FIG. 4.

Then, while the vehicle is at rest, any moisture collecting on the windshield and freezing in place or snow or sludge collected will be extend over the strands 31, even to the extent that a sheet of ice 124 (FIG. 2A) may be frozen in place covering the windshield and strands.

For ice sheets extending over the strands, the ice will tend to bridge over those strands to form thin, bridges of ice over such strands so that drawing the strands away from the windshield will tend to cut the strands through the overlying thin ice.

Thus, when the driver approaches the vehicle to get underway, for the preferred embodiment, the draw bar 41 may be released and lifted away from the windshield at one end to gradually draw the strands 31 away from the windshield starting closest to the draw bar 41 and progressing across the windshield cutting through the ice and sludge. It will be appreciated that the relatively small diameter of the strands 31, for instance 0.024 inch diameter, will provide an effective cutting tool for cutting through the thickness of any sheet of ice that might be expected on the windshield. In other embodiments, which include draw bars on both sides of the windshield, it will be understood that the strands may be drawn away from the windshield starting at either side of the vehicle.

It will be appreciated that the strands themselves may be constructed of numerous different flexible materials such as metal wire, multi-strand twisted wire, high tensile plastic such as a synthetic polymer, polyamide or the like. In any event the strands may be spaced apart at various different spatial relationships, it only being important that the strands be spaced sufficiently close together so that a sheet of ice on the windshield will be cut and severed into somewhat narrow segments so that removal is convenient and effective.

Then, when the device is to be stored, the push button 195 at the top of FIG. 6A can be pressed downwardly to place the notch 203 in clearance relationship relative to the corners of the hex flange 72 to free the spool to wind up and draw the strands 31 into the housing 21 in spaced relationship on their respective barrels.

Of course, the overall length of the housing, draw bar and number of strands or wires will vary with the size of the vehicle, it being recognized that for larger vehicles, such as long haul trucks and the like, the housing will be longer, more strands and longer as up around 25 to 30 inches long but, of course, varied by the size of the vehicle and windshield.

In some embodiments I construct the tethers of hardened but flexible material to thus prevent tampering and unauthorized removal once trapped in place by the closed vehicle door.

For the strands, I have selected a metal wire diameter of 0.024 inches although slightly smaller or larger diameters will suffice and other high strength material will work. I have tested ten pound strength wire similar to fish leaders and found it satisfactory. As will be appreciated by those skilled in the art, a wire diameter smaller than the expected thickness of the ice sheet is preferable.

From the foregoing it will be appreciated that the deicer device of the present invention provides effective and convenient means for removing ice and snow from a windshield. The device is compact and, lightweight, convenient to store and is relatively easy to deploy and has proven highly effective in removing ice sheets.

Therefore, the foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle windshield deicer device for positioning on the surface an automobile windshield and comprising:
    an elongated housing having an elongated opening device along one side thereof;
    an elongated spool rotatable in the housing;
    a plurality of annular flanges positioned along said spool forming a plurality of recesses;
    a plurality of flexible individual strands wound on the spool in a laterally spaced apart relationship within said recesses and constructed to be dispensed through the opening device in the same laterally spaced apart relationship to form distal extremities; and
    a rigid draw bar capturing the respective distal extremities in the spaced apart relationship.

2. The vehicle windshield deicer device as set forth in claim 1 wherein:
    the housing is constructed with the opening device in the form of a plurality of individual openings, one for each of the respective strands to receive the individual strands.

3. A vehicle windshield deicer device for positioning on the surface of an automobile windshield comprising:
    an elongated housing to be positioned with one side butting the windshield;
    the housing including respective top and bottom portions, the top portion having a cylindrical shape with diametrical opposite sides formed with downwardly extending legs, the bottom section being formed with a upwardly opening arcuate tubular section curved upwardly on its opposite sides and at the diametrical opposite sides of the housing, turned downwardly to form respective vertical legs which then turn outwardly to form coextensive flanges extending from opposite sides of the housing to form the surface to abut against the windshield; and
    an elongated spool received rotatably in the housing and formed with strands on the spool to be dispensed through the an opening in the housing whereby the housing may be abutted against the windshield surface and the strands dispensed out the opening and under the flange extending from the opening side of the house said flange pressed against the strands as the strands are dispensed from the opening to extend out across the windshield.

* * * * *